United States Patent [19]

Young

[11] Patent Number: 5,391,044

[45] Date of Patent: Feb. 21, 1995

[54] LIFTING AND TOWING APPARATUS

[76] Inventor: Robert N. Young, 1603 Scenic Ridge, Houston, Tex. 77284

[21] Appl. No.: 50,585

[22] Filed: Apr. 22, 1993

[51] Int. Cl.⁶ .................................................. B60P 3/12
[52] U.S. Cl. ...................................... 414/563; 280/402
[58] Field of Search ......................... 414/563; 280/402

[56] References Cited

U.S. PATENT DOCUMENTS

| | | | |
|---|---|---|---|
| 2,183,478 | 12/1939 | Holmes et al. | 414/563 |
| 2,726,777 | 12/1955 | Wiley | 414/563 |
| 2,793,770 | 5/1957 | St. Denis | 414/563 |
| 3,434,607 | 3/1969 | Nelson | 414/563 |
| 3,690,482 | 9/1972 | Gaumont | 414/563 |
| 4,384,817 | 5/1983 | Peterson | 414/563 |
| 4,573,857 | 3/1986 | Porter, Sr. et al. | 414/563 |
| 4,632,629 | 12/1986 | Kooima | 414/563 |
| 4,737,066 | 4/1988 | Allison, Jr. | 414/563 |
| 4,775,285 | 10/1988 | Zackovich | 280/402 X |

FOREIGN PATENT DOCUMENTS

| | | | |
|---|---|---|---|
| 3508341 | 9/1986 | Germany | 414/563 |
| 760688 | 11/1956 | United Kingdom | 280/402 |

OTHER PUBLICATIONS

Holmes Prostar brochure, Holmes International Inc.

Primary Examiner—David A. Bucci
Attorney, Agent, or Firm—Bill B. Berryhill

[57] ABSTRACT

Lifting and towing apparatus for attachment to a towing vehicle having a winch thereon and the frame of which includes a pair of spaced apart longitudinal beams at least partially supported on a rear axle of said vehicle. The apparatus includes a support assembly extending transversely between the vehicle beams and opposite outer ends of which are attachable to opposing ones of the beams directly above the rear axle. An arm assembly extends rearwardly from the support assembly and has at least one lifting connection for connection to the winch and by which the distal end of the arm assembly may be lifted. A cradle assembly is connected to the distal end of the arm assembly for securing the front or rear wheels of a towed vehicle thereto for lifting above the ground in response to lifting of the distal end of the arm assembly by the winch.

11 Claims, 3 Drawing Sheets

LIFTING AND TOWING APPARATUS

BACKGROUND OF THE INVENTION

1. Field of the Invention

The present invention pertains to lifting and towing apparatus. More specifically, the present invention pertains to lifting and towing apparatus attachable to a towing vehicle and to which the front or rear wheels of a towed vehicle may be secured for lifting above the ground.

2. Description of the Prior Art

Because of the design of present day vehicles, lifting and towing apparatus for towing a disabled vehicle typically includes some type of wheel engaging apparatus to which the front or rear wheels of the towed vehicle may be secured for lifting above the ground in response to power manipulation from a towing vehicle. The towing vehicle is typically a wrecker truck or a pick-up truck which has been adapted for towing operations. In either case, the lifting and towing apparatus is typically produced by a manufacturer other than the wrecker or pick-up truck manufacturer. The apparatus is retrofitted to the wrecker or pick-up truck. Obviously, some types of lifting and towing apparatus are not suitable for one or the other. For example, many types of lifting and towing apparatus for wrecker trucks are hydraulically operated and require hydraulic components that are not suitable for use with a pick-up truck, mechanical winch devices being the preferred method of operation with pick-up trucks.

There are many types of lifting and towing apparatus and several ways of attaching them to the towing vehicle. As mentioned, some of these devices utilized with wrecker trucks are mounted above the wrecker frame either on or directly below the wrecker bed. Most of these are hydraulic units. See for example U.S. Pat. Nos. 4,634,37; 4,679,978; 4,737,066; 4,797,057; and 4,798,509.

There are other designs such as those shown in U.S. Pat. Nos. 3,951,280; 4,384,817; 4,741,661; and 4,775,285 which are suitable for mounting on the bed or the top of the frame of a pick-up truck. However, most of these are also hydraulic units and are not suitable for mechanical winch and boom construction.

There are a number of other designs which are suitable for mounting on pick-up trucks. See U.S. Pat. Nos. 4,451,193; 4,557,496; 4,573,857; and 4,632,629. Some of these are hydraulic; others are suitable for winch operation. However, in these designs, the weight of the towed vehicle is supported at the back of the truck, well to the rear of the rear axle. This creates a moment arm which tends to lift the front of the truck off of the ground. This results in instability during towing and limits the weight of the towed vehicle which can be handled therewith.

Not only do many designs have inherent operating limitations, they are also relatively expensive and not easy to attach to a towing vehicle. Most towing operators prefer a relatively inexpensive, uncomplicated and easy to operate lifting and towing apparatus. The fact that there are so many different designs, indicates a continued search for suitable apparatus.

SUMMARY OF THE PRESENT INVENTION

The present invention provides lifting and towing apparatus for attachment to a towing vehicle having a winch thereon and the frame of which includes a pair spaced apart longitudinal beams at least partially supported on a rear axle of the vehicle. The apparatus uniquely includes a support member which extends transversely between the pair of beams and the opposite outer ends of which are attachable to opposing ones of the beams directly above the rear axle of the vehicle. The apparatus includes an arm assembly, the proximal end of which is swivelingly connected to the support member and which extends rearwardly from the support member. At least one lifting connection is provided on the arm assembly for connection to the winch by which the distal end of the arm assembly may be lifted. A cradle assembly is connected to the distal end of the arm assembly substantially perpendicular thereto and to which the front or rear wheels of a towed vehicle may be secured for lifting above the ground in response to lifting of the distal end of the arm assembly by the winch. The arm assembly may include a pivot arm which is attached to the support member for rotation about an axis parallel to the rear axle of the vehicle and an extension arm one end of which is attached to the pivot arm and the opposite end of which is attached to the cradle assemble. The extension arm may be of articulated construction so as to allow a portion of the arm and the cradle assembly to be drawn up in a folded or articulated stored position when not in use.

The lifting and towing apparatus of the present invention is unique in several of its features. First and foremost, the support of the apparatus is provided by a support device which is attached directly to the frame of the towing vehicle directly above its rear axle. Thus, there is no moment arm, as in other designs, which would tend to cause the towing vehicle to tip about its rear axle. Furthermore, this support device is easily and quickly attachable to the truck frame without altering the frame or truck bed. It can be mounted without any welding on the truck.

The lifting and towing apparatus of the present invention is extremely easy to assemble, requiring a few simple connections and attachment to the winch of the towing vehicle. It's simple construction and operation make it affordable to any towing operator. The lifting and towing apparatus of the present invention is easily adaptable for most any make of truck. It is adjustable in length for different length trucks. Its cradle is adjustable for vehicles of varying axle lengths and various wheel sizes. It is essentially universally usable. Many other objects and advantages of the invention will be apparent from reading the description which follows in conjunction with accompanying drawings.

DESCRIPTION OF A PREFERRED EMBODIMENT

Figure 2:
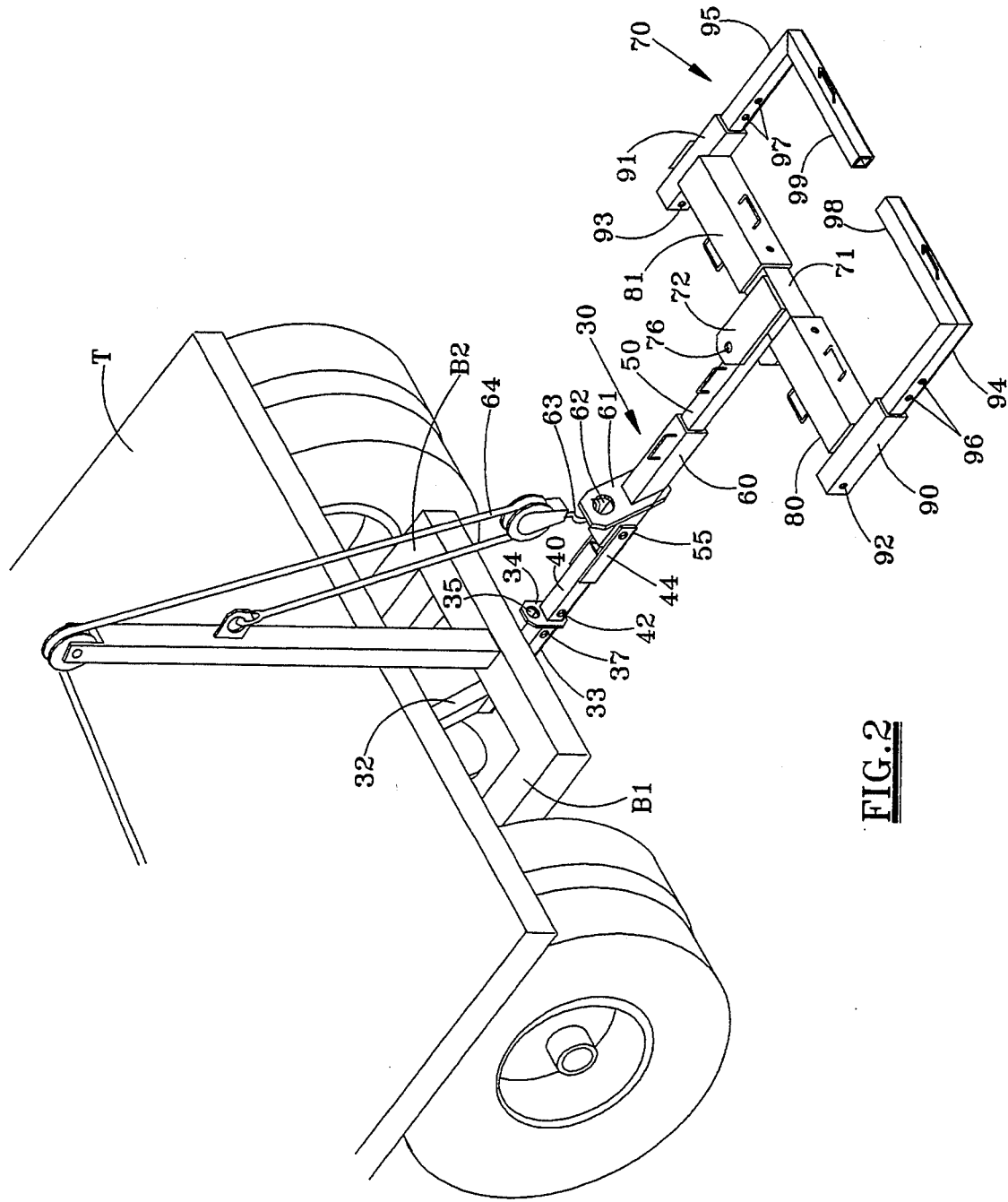
FIG. 2 is a perspective view of the lifting and towing apparatus of the present invention, shown attached to a truck, according to a preferred embodiment thereof.
Figure 3:
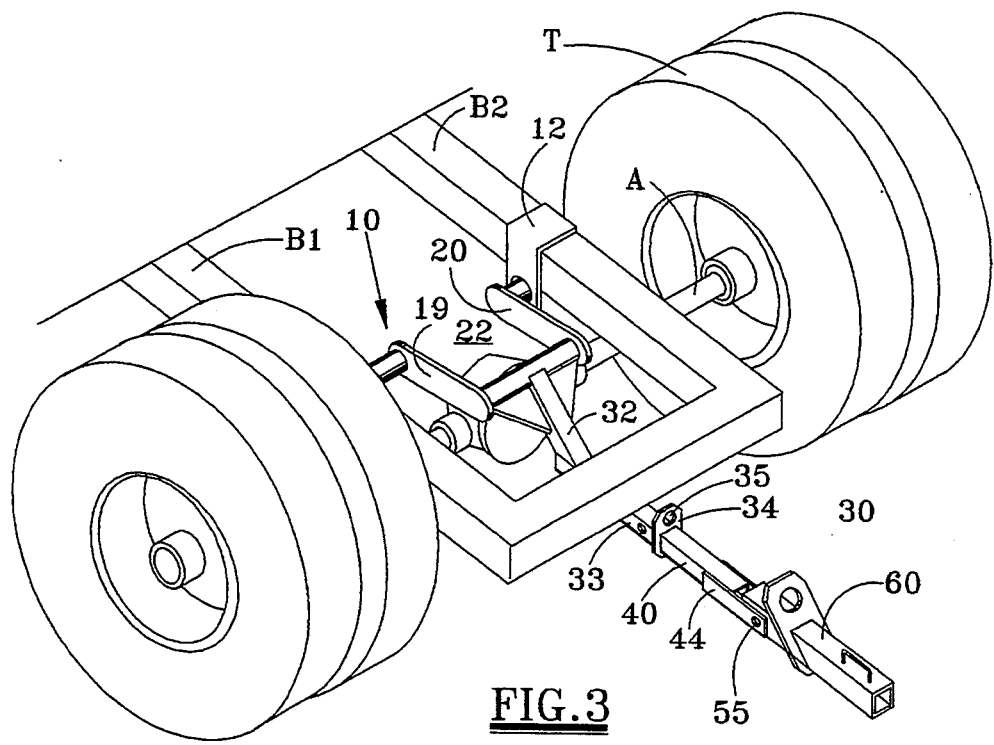
FIG. 3 is a perspective view of a forward portion of the lifting and towing apparatus of the present invention showing its attachment to the chassis of a truck, according to a preferred embodiment thereof.

Referring now to the drawings, the lifting and towing apparatus of the present invention is designed for attachment to a towing vehicle, such as the truck T, portions of which are shown in FIGS. 2 and 3, having a winch thereon (not shown) and the frame of which includes a pair of spaced apart longitudinal beams B1,B2 at least partially supported on a rear axle A (see FIG. 3) of the vehicle T.

Figure 1:
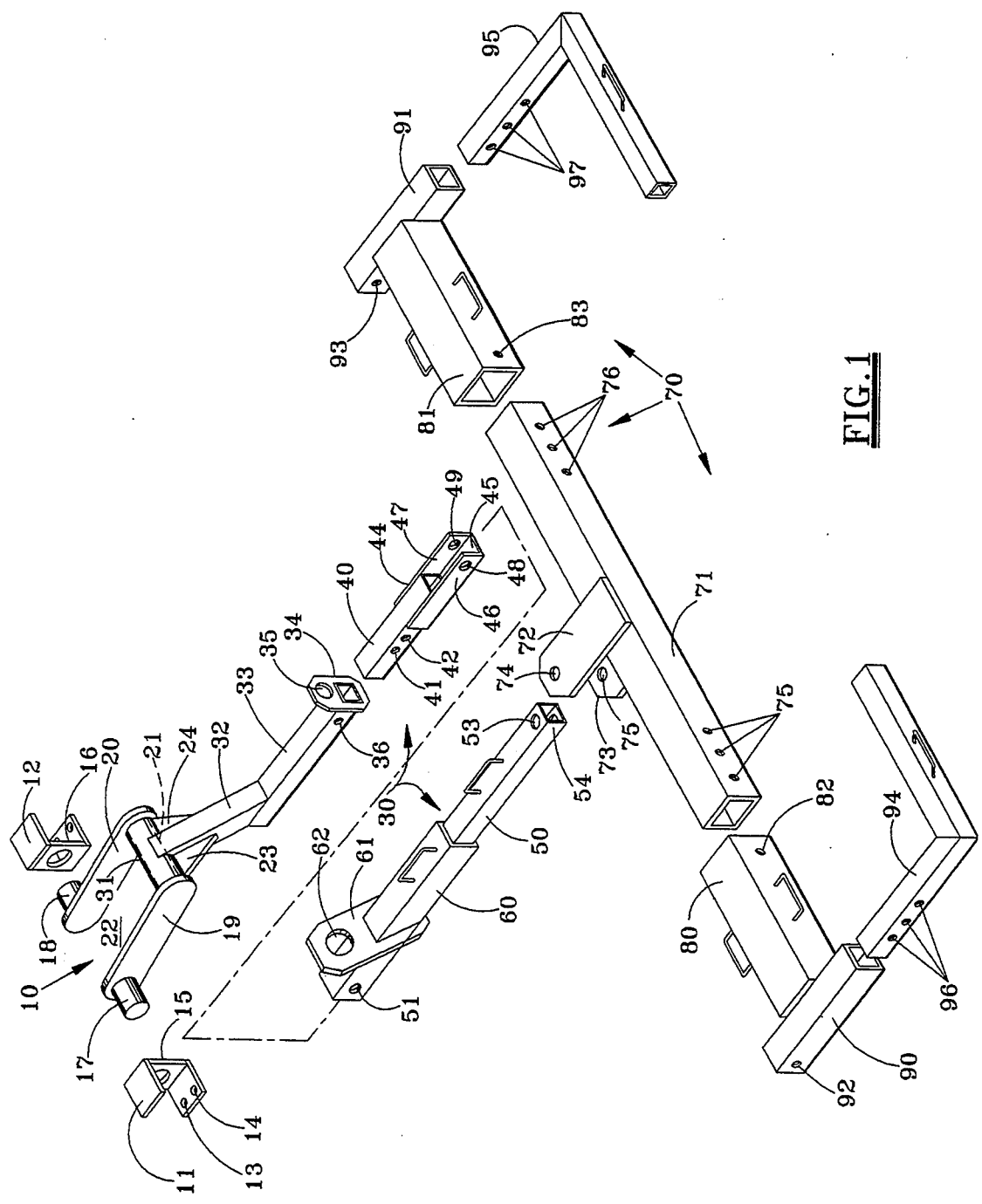
FIG. 1 is an exploded perspective view of the components of the lifting and towing apparatus of the present invention, according to a preferred embodiment thereof.

The lifting and towing apparatus includes a support assembly 10 which includes opposing channel members 11 and 12, approximately six to eight inches long (depending on the make and model of the vehicle on which it is to be attached). Usually, rubber stops are mounted in holes on the lower portion of the frame beams B1,B2. These stops (not shown) may be removed and the holes enlarged to receive one half inch bolts (not shown). The lower side of the channels 11 and 12 may be provided with corresponding holes 13 and 14 (See FIG. 1) by which the channels 11 and 12 may be attached to the beams B1,B2 of the vehicle frame. The web 15,16 of each of the channels 11,12 may be provided with a hole to receive the end of a short section of pipe 17,18 which may be welded thereto. The opposite ends of the pipe sections 17 and 18 are received in corresponding holes provided in a pair of parallel support plates 19,20 which support an intermediate section of pipe 21 welded thereto. Thus, the support assembly 10 comprises first and second end portions made up of channels 11 and pipe 17 and channel 12 and pipe 18, respectively, for attachment to the frame of the towing vehicle T directly above its rear axle A and an intermediate portion of pipe 21 supported by parallel support plates 19,20 for disposition parallel to and rearwardly of the rear axle A leaving a space 22 between the opposing end portions.

The arm assembly 30 includes a pivot arm which includes a sleeve member 31, a first pivot arm portion 32 affixed to the sleeve member 31 and a second pivot arm portion 33 fixed to the first pivot arm portion 32. Braces 23 and 24 welded to sleeve 31 and first pivot arm portion 32 strengthen the connection of sleeve 31 to pivot arm portion 32. In assembly, the sleeve 31 is placed around the intermediate portion 21 of the support assembly 10 prior to the ends of the intermediate portion 21 being welded to the support plates 19 and 20. The sleeve 31 is rotatable on the intermediate support portion 21 so that the proximal end of the pivot arm may rotate about an axis which is parallel to the rear axle A of the vehicle T. The first pivot arm portion 32 is affixed to the sleeve 31 in an angular disposition, relative to the surface on which the towing vehicle T is to be supported, and the second pivot arm portion 33 is affixed to the first pivot arm portion 32 for relatively parallel disposition with the surface on which the towing vehicle T is to be supported. The first and second pivot arm portions 32,33 are preferrably made of square tubular material. At the distal end of the second pivot arm portion 33 is a plate 34 with a hole 35 providing a lifting connection for connection to the winch (not shown) of the vehicle T by which the arm assembly may be lifted. A transverse pin hole 36 (see FIG. 1) is also provided near the distal end of the tubular second pivot arm portion 33.

Figure 4:
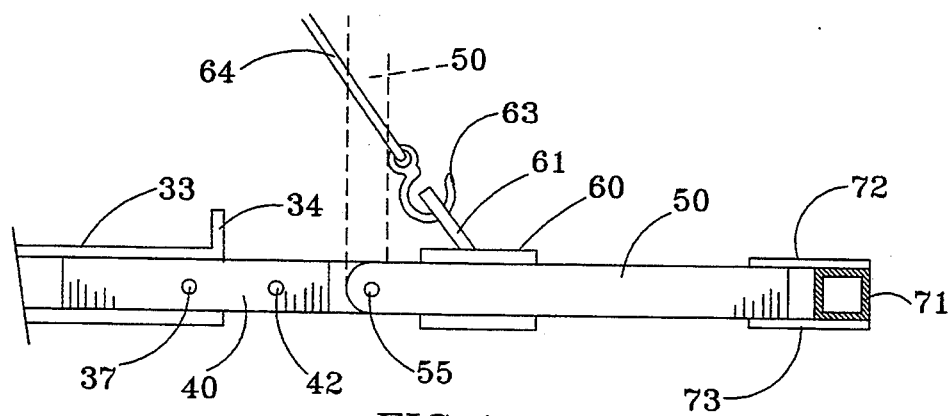
FIG. 4 is a side elevation view, partially in section, of an intermediate portion of the lifting and towing apparatus of the present invention.
Figure 5:
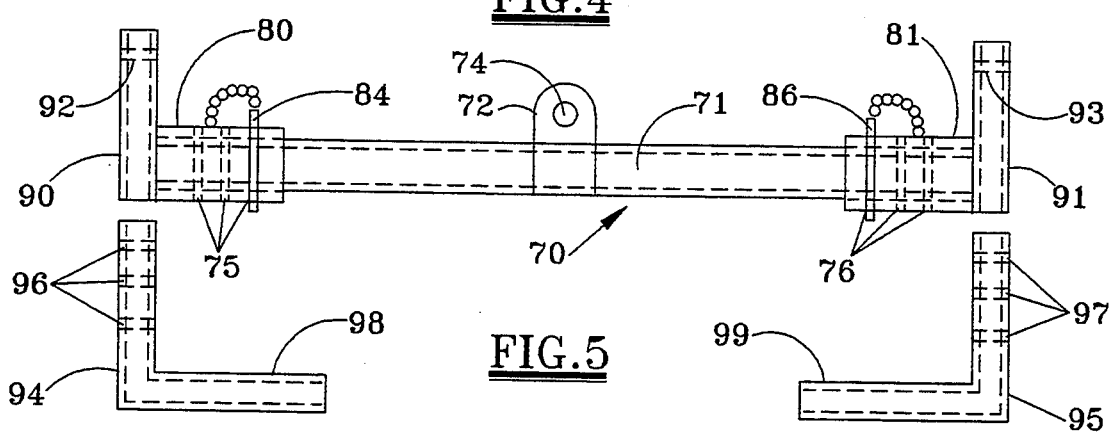
FIG. 5 is a plan view of a rearward portion of the lifting and towing apparatus of the present invention.

The arm assembly 30 also includes an extension arm which is made up of two portions. The first portion of the extension arm compises a square tubular member 40 which is smaller than the tubular member from which the second pivot arm portion 33 is made and can thus be slidingly received thereby. The first extension arm portion 40 is provided with transversely bored holes 41,42 and corresponding coaxial pipe (not shown) welded in the tubular member 40. These holes 41,42 and the solid wall hole provided through the pipes correspond with and are registerable with the transverse holes 36 provided in the second pivot arm portion 33. A pin 37 (see FIGS. 2 and 4) may be placed in the hole 36 and either hole 41 or 42, depending on the length desired, to fix the length of the arm assembly 30.

Welded to one end of the first extension arm portion 40 is a connector portion 44 which is a channel-like member having upwardly extending sides 46,47 connected by a lower web portion 45. Transverse holes 48 and 49 are provided in the sides 46 and 47. The second extension arm portion 50 is also made of a square tubing and is provided at one end with transverse holes 51 and corresponding coaxial pipe welded therein and at the opposite end with holes 53 and coaxial pipe 54 which are perpendicular to the axis of holes 51.

The first and second extension arm portions 40 and 50 may be articulatingly connected by aligning the holes 51 with the holes 48 and 49 of the connector portion and placing a bolt or pin 55 (see FIGS. 2, 3 and 4) therethrough. As can be understood, this allows the second extension arm portion 50 to pivot upwardly relative to the surface on which the towing vehicle is to be supported, such as illustrated by dotted lines in FIG. 4, but prevents downwardly pivoting thereof.

Another lifting connection may be provided at the extension arms. This connection may be provided by a short section of square tubing 60 which may be placed around the smaller square tubing of the second extension arm portion 50 prior to its connection with the first extension arm 40. A piece of plate 61 may be welded at an angle thereto and provided with a hole 62 for engagement by the hook 63 attached to winch cable 64 of the towing vehicle.

The cradle assembly 70 of the apparatus of the present invention may comprise a tubular cross member 71 at the center of which is welded upper and lower plates 72,73 having holes 74 and 75 therein and forming a clevis for attachment to the distal end of the second extension arm portion 50. This is accomplished by aligning the clevis holes 74 and 75 with the holes 53 and pipe 54 and placing a pin 76 therein. (See FIG. 2) This allows pivoting of the cradle assembly 70 about an axis which is substantially perpendicular to the surface on which the towing vehicle is to be supported.

Wheel supporting assemblies are carried on opposite ends of the cross member 71. Each of the wheel supporting assemblies includes a section of square tubing 80,81, larger than tubing of the cross member 71 slidingly moveable thereon. Transverse holes 82 and 83 are registerable with corresponding ones of a series of holes 75,76 and coaxially aligned pipe provided in opposite ends of the cross member 71, for receiving a pin 84,86 to fix the wheel supporting members 80,81 at predetermined spaced relationships for accommodating towed vehicles of varying axle lengths.

Welded to the outer ends of each of the tubular members 80,81 transversely thereto are square tubular members 90,91. Transverse holes 92,93 are provided through these tubular members 90,91. L-shaped square tubular members 94,95 of smaller cross section, may be slidingly received in the tubular members 90,91 and fixed thereto with pins placed through the holes 92,93 and a corresponding one of a series of holes 96,97 provided in the L-shaped members 94,95. This provides the L-shaped tubular members 94,95 with limited perpendicular movement and allows the wheel supporting assemblies to accommodate towed vehicles of varying wheel sizes. Nylon straps and ratchet devices (not shown) may be attached to the members 94 and 95 to allow the strap to be wrapped around the towed vehicle's tires, securing them to the cradle assembly.

The lifting and towing apparatus of the present invention can be carried and used in several ways. When not in use, the extension arm assembly 30 and cradle assembly 70 can be removed from the pivot arm 32,33 and the pivot arm 32,33 simply supported by engagement of the winch cable with the hole 35 of the connection plate 34. With the entire apparatus assembled and attached, the second extension arm portion 50 and the cradle assembly 70 attached thereto may be folded into an upright position out of the way by attachment of the winch cable 64 to the lifting connector plate hole 62 causing the extension arm assembly 30 to articulate and pivot upwardly relative to the surface on which the towing vehicle is supported. (See dotted line position of FIG. 4) For subsequent use, the extension arm assembly 30 may be lowered into a relatively level position so that the cradle assembly 70 rests on the ground with the cross member 71 adjacent the forward edge of the towed vehicle's wheels. The members 80 and 81 can be adjusted for proper axle length and the L-shaped members 94,95 can be engaged with the corresponding tubular members 90 and 91 so that the feet 98,99 thereof may be placed just to the rear of the wheels of the vehicle to be supported thereon. With all of these members pinned in place and the wheels of the towed vehicle strapped to the cradle assembly 70, the winch can be taken up causing the arm assembly 32,33, the cradle assembly 70 and the wheels of the towed vehicle secured thereto to be lifted above the ground in response to the lifting of the distal end of the arm assembly 32,33 by the winch.

As can be understood from the foregoing description, the manufacture, installation and operation of the lifting and towing apparatus of the present invention is relatively simple and inexpensive. It is unique in its attachment to the frame of the towing vehicle T directly above the rear axle A. It is unique in its universal attachment and application. It is unique in providing for retrofitting without altering the towing vehicle to which it is attached.

A single embodiment of the invention has been described herein. However, many variations thereof can be made without departing from the spirit of the invention. Accordingly, it is intended that the scope of the invention be limited only by the claims which follow.

I claim:

1. Lifting and towing apparatus for attachment to a towing vehicle having a winch with winch cable thereon and a frame which includes a pair of spaced apart longitudinal beams at least partially supported on a rear axle of said vehicle, said apparatus comprising:

support means for extending transversely between said pair of beams, opposite outer ends of said support means being attachable to opposing ones of said beams for supporting the entire weight of said apparatus directly above said rear axle;

an arm assembly comprising a pivot arm having a proximal end which is swivelingly connected to said support means for rotation about an axis which is parallel to the rear axle of said vehicle, extending rearwardly from said support means for perpendicular alignment with said rear axle and having at least one lifting connection for connection to said winch cable and by which a distal end of said arm assembly may be lifted., said arm assembly also comprising an extension arm having a first portion slidingly and coaxially engageble with the distal end of said pivot arm and a second portion one end of which is connected to said first extension arm portion for articulated movement about an axis which is parallel to said rear axle and the other end of which provides the distal end of said arm assembly; and a cradle assembly connected to said distal end of said arm assembly substantially perpendicular thereto and to which front or rear wheels of a towed vehicle may be secured for lifting above the ground in response to lifting of the distal end of said arm assembly by said winch cable.

2. Lifting and towing apparatus as set forth in claim 1 in which said support means comprises first and second end portions for supporting the entire weight of said apparatus and said towed vehicle directly above said rear axle and an intermediate portion supported by said end portions for disposition parallel to and rearwardly of said rear axle leaving a space between opposed inner ends of said end portions.

3. Lifting and towing apparatus as set forth in claim 2 in which said support means includes a pair of parallel support members one end of each one of which is attached to a corresponding one of said end portions and an opposite end of which is attached to a corresponding end of said intermediate portion.

4. Lifting and towing apparatus as set forth in claim 1 in which said pivot arm comprises a first pivot arm portion for angular disposition relative to the surface on which said towing vehicle is to be supported and a second pivot arm portion in fixed angular relationship with said first pivot arm portion for relatively parallel disposition with the surface on which said towing vehicle is to be supported.

5. Lifting and towing apparatus as set forth in claim 4 in which one end of said first pivot arm portion is affixed to a sleeve member which surrounds said intermediate portion of said support means and by which said pivot arm rotates about said axis.

6. Lifting and towing apparatus as set forth in claim 1 including a connector portion by which said first and second extension arm portions are articulating connected, said connector portion allowing said second arm extension portion to pivot upwardly relative to the surface on which said towing vehicle is supported but preventing downwardly pivoting thereof.

7. Lifting and towing apparatus as set forth in claim 1 in which said extension arm is provided with a lifting connection for connection to said winch cable and by which said arm assembly, said cradle assembly and the wheels of said towed vehicle may be lifted.

8. Lifting and towing apparatus as set forth in claim 7 in which said extension arm lifting connection is provided by a sleeve member slidingly carried on said extension arm for limited longitudinal movement thereon and having a winch cable engageable member attached thereto.

9. Lifting and towing apparatus as set forth in claim 1 in which said cradle assembly comprises a cross member the center of which is attached to said opposite end of said extension arm for pivoting about an axis which is substantially perpendicular to the surface on which said towing vehicle is to be supported and wheel supporting assemblies carried on opposite ends of said cross member, each of said wheel supporting assemblies being engageable with corresponding ones of a pair of front or rear wheels of said towed vehicle.

10. Lifting and towing apparatus as set forth in claim 9 in which said wheel supporting assemblies are slidingly mounted on said cross members for limited movement toward or away from each other to accommodate towed vehicles of varying axle lengths.

11. Lifting and towing apparatus as set forth in claim 10 in which each of said wheel supporting assemblies comprises a first supporting portion mounted on said cross member and a second supporting portion attached to said first supporting portion for limited movement perpindicular to said cross member allowing said wheel supporting assemblies to accommodate towed vehicles of varying wheel sizes.

* * * * *